United States Patent [19]

Trevizo

[11] Patent Number: 4,882,945
[45] Date of Patent: Nov. 28, 1989

[54] PEDAL EXTENSION DEVICE

[76] Inventor: Jose Trevizo, 434 Auburn Ave., San Marcos, Calif. 92069

[21] Appl. No.: 339,522

[22] Filed: Apr. 17, 1989

[51] Int. Cl.⁴ .............................................. G05G 1/14
[52] U.S. Cl. ...................................... 74/594.3; 74/44; 74/594.4; 74/594.1
[58] Field of Search ............................ 74/594.1–594.4, 74/44

[56] References Cited

U.S. PATENT DOCUMENTS

| | | | |
|---|---|---|---|
| 447,145 | 2/1891 | Cushman | 74/594.3 |
| 516,137 | 3/1894 | Tyler | 74/594.3 |
| 550,490 | 11/1895 | Edgar | 74/594.3 |
| 623,863 | 4/1899 | Atterbury | 74/594.3 |
| 1,714,134 | 5/1929 | Poyser | 74/594.3 |
| 4,446,754 | 5/1984 | Chattin | 74/594.3 |
| 4,519,271 | 5/1985 | Chattin | 74/594.3 |
| 4,708,025 | 11/1987 | Lee | 74/44 |
| 4,807,491 | 2/1989 | Stuckenbrok | 74/594.1 |

FOREIGN PATENT DOCUMENTS

| | | | |
|---|---|---|---|
| 122337 | 10/1946 | Australia | 74/594.3 |
| 48810 | 9/1889 | Fed. Rep. of Germany | 74/594.3 |
| 102801 | 6/1897 | Fed. Rep. of Germany | 74/594.3 |
| 101355 | 3/1898 | Fed. Rep. of Germany | 74/594.3 |
| 110927 | 5/1899 | Fed. Rep. of Germany | 74/594.3 |
| 768103 | 7/1934 | France | 74/594.3 |
| 799522 | 6/1936 | France | 74/594.1 |
| 1074690 | 10/1954 | France | 74/594.3 |
| 544471 | 6/1956 | Italy | 74/594.3 |
| 28693 | of 1898 | United Kingdom | 74/594.3 |
| 3741 | of 1899 | United Kingdom | 74/594.3 |
| 21313 | of 1899 | United Kingdom | 74/594.3 |

Primary Examiner—Vinh Luong
Attorney, Agent, or Firm—Lewis E. Massie

[57] ABSTRACT

A simple improved rotary to linear motion mechanism for increasing the pedal leverage on a bicycle using a telescoping pedal support arm and a rotating crank-disc engaging a coupling connecting rod to convert the rotary motion of the pedal to linear extension of the pedal support arm.

2 Claims, 1 Drawing Sheet

PEDAL EXTENSION DEVICE

BACKGROUND OF THE INVENTION

1. Field of the Invention

Early in the design of bicycle pedal arrangements many designs for increasing the leverage during the down stroke were conceived and patented. Many of the early patents disclosed means for increasing the length of the pedal support arms during the down stroke portion of the pedal movement.

2. Description of the Prior Art

Design improvements pertaining to mechanisms for increasing the length of the pedal support arms during the down stroke are disclosed in U.S. Pat. No. 4,519,271 issued on May 28, 1985, Chattin, and U.S. Pat. No. 4,446,754 issued on May 8, 1984, Chattin. Both of these patents using telescoping pedal arms and a cam arrangement for converting rotary motion to linear motion.

SUMMARY OF THE INVENTION

The principal objective of the present invention is to provide an improved, simple mechanism for converting the rotary motion of the bicycle pedal into vertical telescopic extension of the pedal support arm. The support arm is composed of two telescoping portions, the arm and a bearing hub.

The bicycle pedal is in a horizontal position as the pedal orbits the sprocket axel. The bearing shaft in the bearing hub of the pedal support arm rotates one complete revolution for each rotation of the sprocket. The hub bearing axially aligned with the pedal axel which extends through the hub and is attached to a crank disc with a radially spaced crank-pin. The crank-pin engaging a connecting rod which is coupled to the pedal arm through a second crank-pin mounted on the pedal arm. Rotation of the pedal axel and attached crank disc introduces a linear motion of the connecting rod and pedal arm.

DETAILED DESCRIPTION OF THE PREFERRED EMBODIMENT

Figure 1:
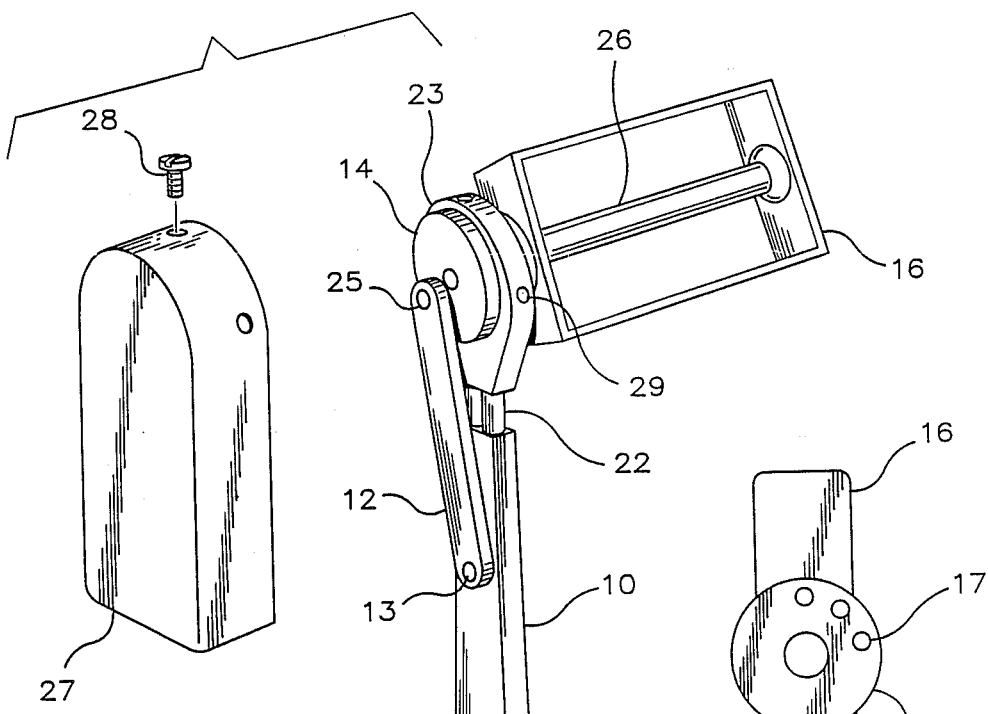
FIG. 1 is a front perspective view of the pedal extension device.

Referring to FIG. 1 the pedal axel 26 is shown attached to circular member 30 then extending through bearing hub bearing 31 to attach to crank-disc 14. A crank-pin 25 radially spaced from the axis of crank-disc 14 engages connecting rod 12 which engages a second crank-pin 13 attach to pedal arm 10. The pedal arm 10 is longitudinally slidably coupled to the hub 23 by telescopic rods 22. The rods 22 are attached to the hub 23 and enter bearings 32 in the arm 10. A protective cover 27 is attached to the bearing hub 23 by screws 28 engaging threaded holes 29 in the hub.

In use, rotation of the pedal axel 26, through the crank-disc and connecting rod converts the rotary motion of the pedal axel to linear motion of the pedal arm.

Figure 2:
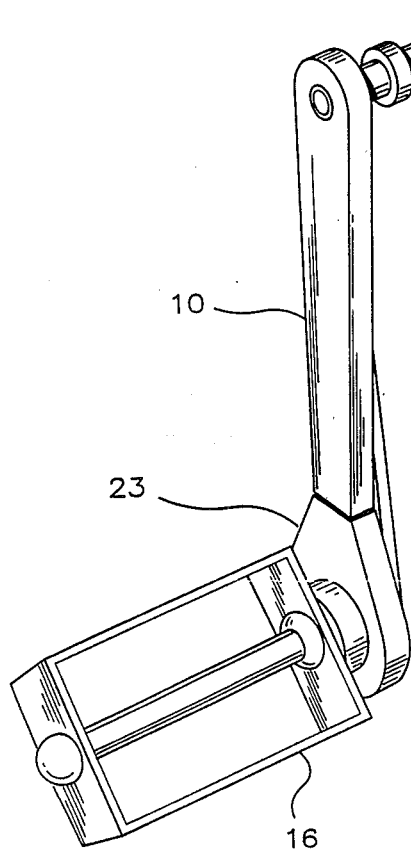
FIG. 2 is a sectional side view of the pedal connection to the pedal arm.

The sectional view of FIG. 2 shows the pedal 16 adjustably fastened to the circular member 30 by screw 15 and axel 26. The axel shaft 26 extending through the hub bearing 31 is attached to the crank-disc. 14. The crank disc having crank-pin 25 engaging connecting rod 12 coupled to pedal arm by crank-pin 13. Telescoping rod 22 fastened to hub 23 and slidable into bearing 32 on the arm 10.

Figure 3:
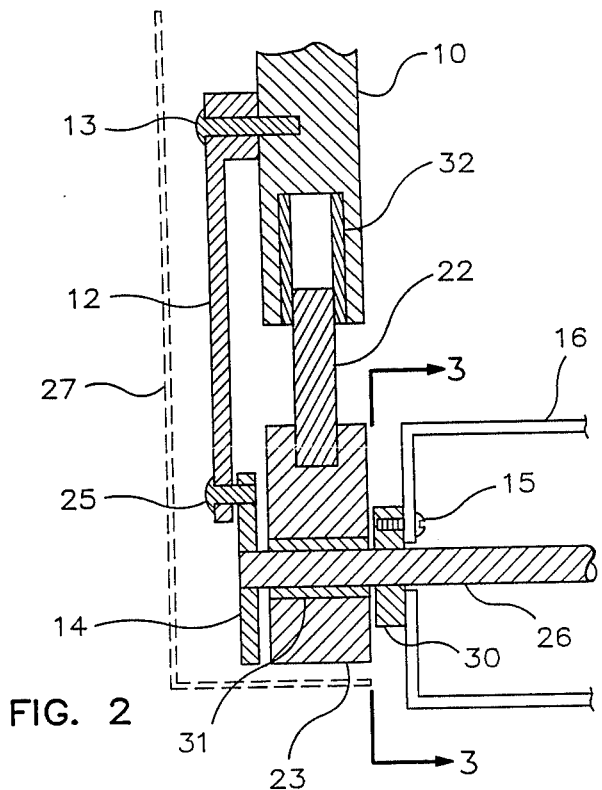
FIG. 3 is a sectional view through 3—3 of FIG. 2.

The sectional view of FIG. 3 taken through 3—3 of FIG. 2 illustrates the rotational adjustment of the pedal axel to the circular member 30 by screw 15 and threaded holes 17.

I claim:

1. A crankshaft pedal arm assembly for increasing the length of a bicycle pedal support arm as a function of the rotary position of a drive sprocket wherein the improvement comprises:
   (a), the pedal support arms terminating in telescopically attached bearing hub;
   (b), a crank-disc with a first radially spaced crank-pin attached to an end of a pedal axel;
   (c), a connecting rod engaging said first crank-pin in the crank-disc rotatably connected to a second crank-pin mounted on the pedal support arm;
   (d), rotation of the crank-disc drives the connecting-rod which introduces reciprocating movement of the bearing hub sliding on a telescopic rod; and,
   (e), a protective covering fastened to the bearing hub extends over the crank shaft-pedal arm assembly.

2. The crank-shaft pedal arm assembly as described in claim 1 wherein the improvement further comprises:
   (a), a pedal adjustably fastened to the axel by means of a circular member having spaced circumferential screws and threaded holes.

* * * * *